(12) United States Patent
Bowling et al.

(10) Patent No.: US 9,054,851 B2
(45) Date of Patent: Jun. 9, 2015

(54) DITHERING CIRCUIT FOR SERIAL DATA TRANSMISSION

(71) Applicant: Microchip Technology Incorporated, Chandler, AZ (US)

(72) Inventors: Stephen Bowling, Chandler, AZ (US); Samar Naik, Chandler, AZ (US); Igor Wojewoda, Tempe, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 14/197,812

(22) Filed: Mar. 5, 2014

(65) Prior Publication Data

US 2014/0254731 A1    Sep. 11, 2014

Related U.S. Application Data

(60) Provisional application No. 61/775,355, filed on Mar. 8, 2013.

(51) Int. Cl.
*H04L 7/00*     (2006.01)
*H04L 7/033*    (2006.01)
*H04L 7/04*     (2006.01)
*H04L 25/49*    (2006.01)

(52) U.S. Cl.
CPC ............ *H04L 7/0079* (2013.01); *H04L 7/0331* (2013.01); *H04L 7/044* (2013.01); *H04L 25/49* (2013.01)

(58) Field of Classification Search
None
See application file for complete search history.

(56) References Cited

U.S. PATENT DOCUMENTS

| 8,275,083 B2 | 9/2012 | Ritter | 375/355 |
| 2011/0058593 A1 | 3/2011 | Chiang | 375/219 |
| 2011/0176589 A1 | 7/2011 | Kolof et al. | 375/224 |

FOREIGN PATENT DOCUMENTS

| EP | 0335797 A1 | 10/1989 | G04G 7/00 |
| EP | 1811714 A1 | 7/2007 | H04L 7/033 |

OTHER PUBLICATIONS

"J2716_201001 Sent—Single Edge Nibble Transmission for Automotive Applications," SAE Technical Paper Series, Socity of Automotive Engineers, 56 pages, Jan. 27, 2010.
International Search Report and Written Opinion, Application No. PCT/US2014/021005, 11 pages, Jun. 5, 2014.

*Primary Examiner* — Adolf Dsouza
(74) *Attorney, Agent, or Firm* — King & Spalding L.L.P.

(57) ABSTRACT

A system for determining a unit time of a serial transmission protocol, wherein the serial transmission protocol defines a unit time (UT) by transmitting a calibration pulse having a predetermined length of N*UT and wherein a receiver is operated by system clock, includes: a clock divider for dividing the system dock by M, wherein M evenly divides N, and a detector for sampling a received data nibble length by using a dithered sampling clock.

22 Claims, 8 Drawing Sheets

US 9,054,851 B2

DITHERING CIRCUIT FOR SERIAL DATA TRANSMISSION

CROSS REFERENCE TO RELATED APPLICATIONS

This application claims the benefit of U.S. Provisional Patent Application Ser. No. 61/775,355, filed Mar. 8, 2013, which is hereby incorporated by reference in its entirety for all purposes as if fully set forth herein.

TECHNICAL FIELD

The present disclosure relates to a dithering circuit for serial data transmission and, in particular, to a dithering circuit for a J2716 Single Edge Nibble Transmission (SENT) protocol nibble period detection.

BACKGROUND

The SAE J2716 SENT protocol is a point-to-point scheme for transmitting signal values, for example from a sensor to a controller. It requires three wires, wherein one wire is used as a signal line and the other two for a supply voltage and ground and provides for an asynchronous one-way voltage interface. It allows for high resolution data transmission with a lower system cost than available serial data solutions.

Data is transmitted in nibbles, wherein a nibble is defined as 4 bits. A SENT protocol message encodes data values in the falling edge to falling edge period of the signal. The message is preceded for synchronization/calibration by a fixed length period which provides a 56 unit time (also known as "ticks") reference. Data values are encoded into nibbles using 12 to 27 unit times. The nibble period detector in a SENT receiver must use a relatively fast clock source to accurately decode the nibble time values.

In particular, according to the SAE J2716 specification, a SENT communication fundamental unit of time (or tick) can be in the range of 3 μs to 10 μs, wherein the maximum allowed clock variation is ±20% from the nominal unit time. On a receiver side, a nibble must be detected asynchronously. To this end, as mentioned above, the protocol provides for a synchronization/calibration pulse which is defined to be 56 unit times long. The pulse starts with a falling edge and remains low for 5 or more unit times followed by pulse that fills the remainder of the 56 unit times (UT). Thus, a receiver can easily determine the respective unit time after receiving such a synchronization/calibration pulse. The length of each data nibble is determined by a fixed start pulse (12 UT) followed by a data pulse whose length is defined by its actual value. As each nibble can have a value between 0 and 15, the variable time portion defined by the nibble value N has a length of N*UT. Thus, the receiver must synchronize with the transmitter and determine the length of the respective data pulses to decode the value of each nibble. Hence, a relatively high clock signal would be required in a receiver to accurately decode the SENT protocol.

The traditional approach to this decode such a signal would be to use a CPU clock that is fast enough to provide sufficient measurement accuracy of the synchronization period. Since many microcontrollers commonly utilize an on-chip clock source having less than the required frequency, there is a need for a solution that can operate with a lower internal clock speed. It is, therefore, desirable to use a lower frequency oscillator both to reduce power consumption and to use available resources on the MCU.

SUMMARY

A method according to embodiments for determining a unit time of a serial transmission protocol, wherein the serial transmission protocol defines a unit time (UT) by transmitting a calibration pulse having a predetermined length of N*UT and wherein a receiver is operated by system clock, includes: dividing the system clock by M, wherein M evenly divides N, and sampling a received data nibble length by using a dithered sampling clock.

In some embodiments, N=56 and M=7. In some embodiments, N=56 and M=14. In some embodiments, N=56 and M=28. In some embodiments, a period generator is used to determine a unit time and wherein the period timer is loaded for three time periods with a X=7 and for one count period with X=8 to generate a dithered count period. In some embodiments, using the dithered sampling clock comprises dividing a number of clock cycles by N/M and dithering each N/M unit times based on a remainder from the division.

A system according to embodiments for determining a unit time of a serial transmission protocol, wherein the serial transmission protocol defines a unit time (UT) by transmitting a calibration pulse having a predetermined length of N*UT and wherein a receiver is operated by system clock, includes: a clock divider for dividing the system clock by M, wherein M evenly divides N, and a detector for sampling a received data nibble length by using a dithered sampling clock.

In some embodiments, N=56 and M=7. In some embodiments, N=56 and M=14. In some embodiments, N=56 and M=28. In some embodiments, a period generator is used to determine a unit time and wherein the period timer is loaded for three time periods with a X=7 and for one count period with X=8 to generate a dithered count period. In some embodiments, using the dithered sampling clock comprises dividing a number of clock cycles by N/M and dithering each N/M unit times based on a remainder from the division.

A method for receiving a serial transmission, according to embodiments includes detecting a falling edge; dividing a clock by M, where M evenly divides N, where N*UT is a length of a predetermined calibration pulse and UT is a unit time; counting clock cycles over the length of the calibration pulse; dividing the number of clock cycles by N/M to obtain a number of clock cycles per calibration period; dithering each N/M unit times proportionally based on the remainder of the number of clock cycles per calibration period; and detecting received data nibble periods based on the dithering.

In some embodiments, N=56 and M=7. In some embodiments N=56 and M=14. In some embodiments N=56 and M=28. In some embodiments a period generator is used to determine a unit time and wherein a period timer is loaded for three time periods with a X=7 and for one count period with X=8 to generate a dithered count period.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

According to various embodiments, a period dithering technique is used in a nibble period detector. This allows the SENT protocol receiver to operate from a clock source that is a fraction of the required frequency. According to various embodiments, a SENT protocol receiver can be operated from a much lower clock frequency than usual high speed serial interfaces. This saves power in the end application. It also allows users to take advantage of, for example, an 8-MHz on-chip RC-oscillator source that is commonly available, for example on microcontrollers manufactured by Microchip Technology, Inc. According to various embodiments, the count period of the SENT nibble detection logic is automatically dithered to obtain greater accuracy from a lower frequency clock source.

Figure 1:
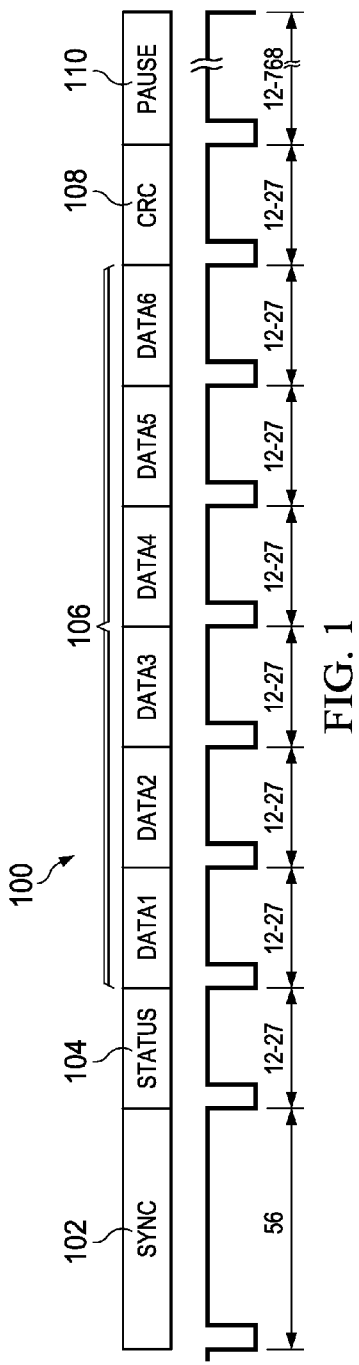
FIG. 1 is a diagram illustrating a SENT message.

Shown in FIG. 1 is a SENT data message 100. The data message 100 includes a sync period 102 of 56 unit times; a status nibble 104 of 12-27 unit times; one to six data nibbles 106 of 12-27 unit times each; a CRC nibble of 12-27 unit times; and an optional pause period 110 of 12-768 unit times.

Figure 2:
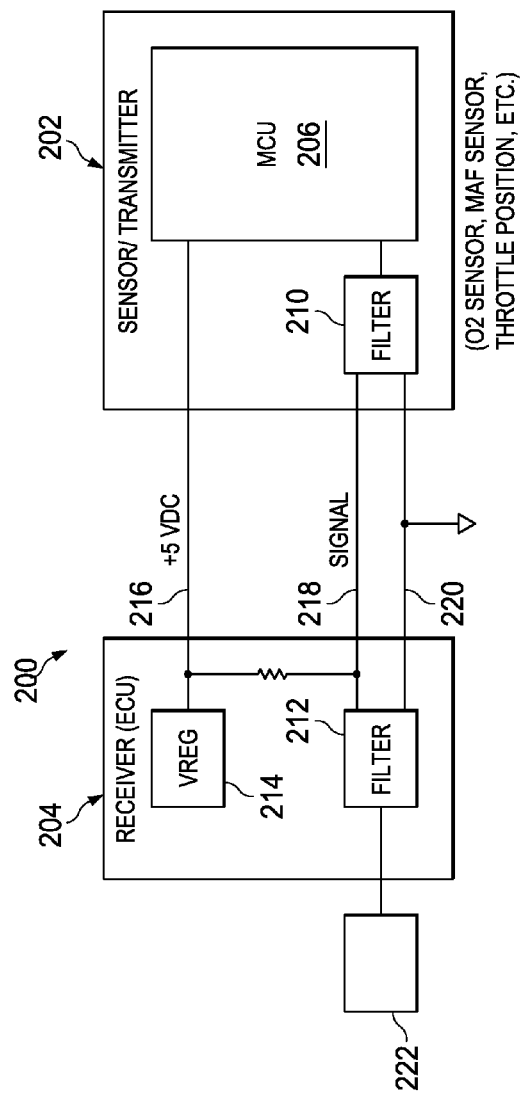
FIG. 2 is a diagram illustrating an exemplary SENT system in accordance with embodiments.

A diagram illustrating an exemplary SENT system in accordance with embodiments is shown in FIG. 2. The system 200 includes one or more transmitters 202 and a receiver 204 communicatively coupled via supply voltage line 216, signal line 218, and ground line 220.

The receiver 204 may include a supply voltage source 214 and one or more line filters 212. In addition, as will be explained in greater detail below, the receiver 204 may include a SENT receiver peripheral 222. The transmitter 202 may likewise include one or more line filters 210, as well as a control device such as a microcontroller unit 206.

The system 200 may be embodied as a sensor system for an automotive engine or other system. In such an implementation, the transmitter 202 may comprise an O2 sensor, an MAF sensor, a throttle position sensor, and the like. The receiver 204 in such embodiments may be an engine control unit.

Figure 3:
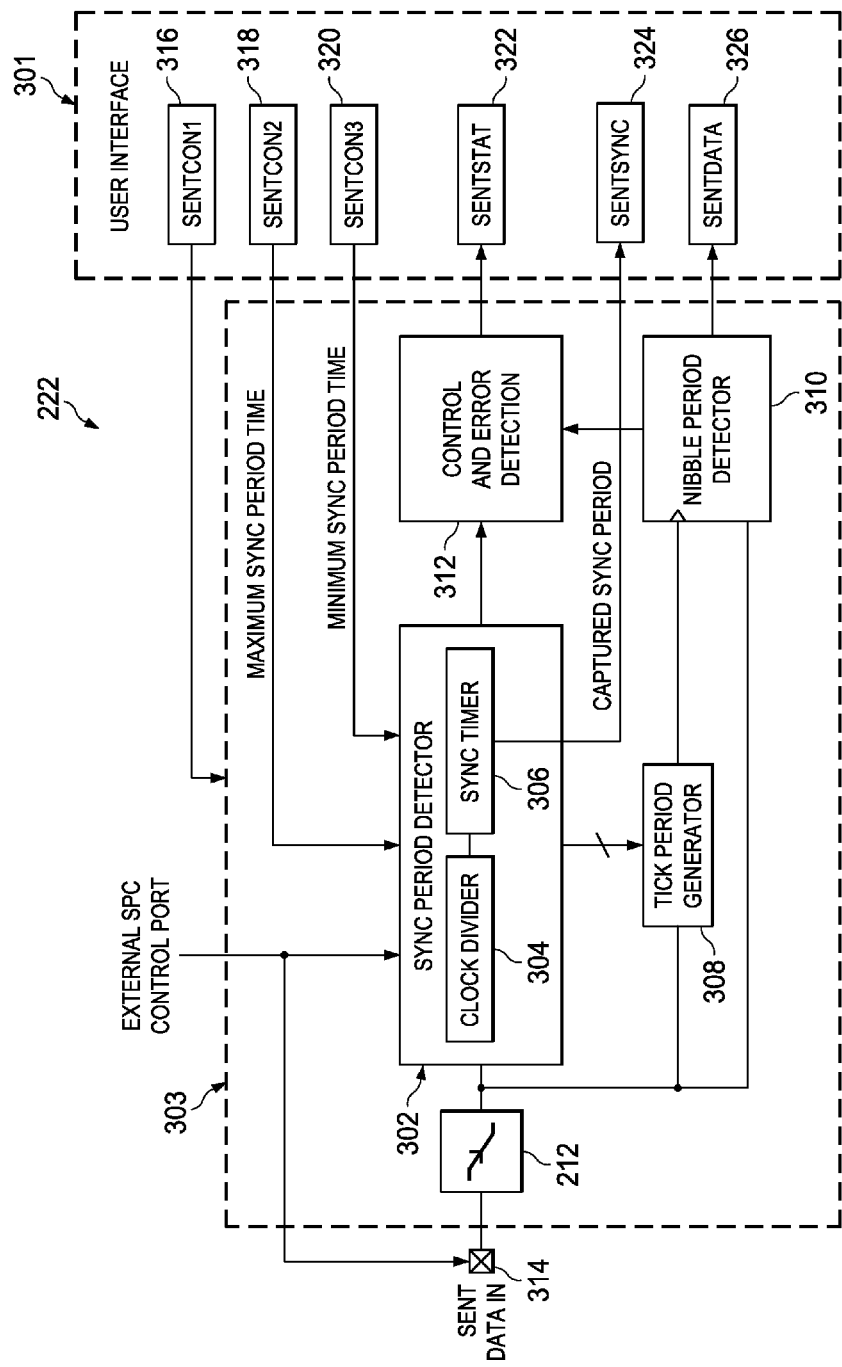
FIG. 3 is a diagram illustrating an exemplary SENT peripheral in accordance with embodiments.

A diagram of the SENT receiver peripheral 222 is shown in greater detail in FIG. 3. In the example illustrated, the SENT peripheral receiver 222 includes receiver portion 303 and a control portion 301. The control portion 301 may include a plurality of control registers, as will be explained in greater detail below.

The receiver portion 303 includes a Sync Period Detector 302 including a clock divider 304 and a sync timer 306. The SENT peripheral receiver further includes a Tick Period Generator 308, a Nibble Period Detector 310, and Control and Error Detection module 312.

Incoming SENT data are received at a SENT data in pin 314 and filtered at 212. The SENTCON1 control register 316 may be used to select a particular mode of operation. For example, in embodiments in which the peripheral is a transceiver, the SENTCON1 control register 316 may be used to select whether the peripheral is operating in a transmit or receive mode. The SENTCON2 control register 318 and the SENTCON3 control register 320 may be used in a receive mode to define the maximum sync period time and the minimum sync period time, respectively. In receive mode, the registers may be referred to as SYNCMAX and SYNCMIN, respectively. A receiver according to various embodiments can be integrated into a microcontroller or can be combined with a transmitter to form a transceiver which could also be integrated into a microcontroller.

The SENTSTAT control register 322 may be used to receive status messages from the control and error detection module 312. The SENTSYNC control register 324 may be used to receive the captured sync period that sets the period for the Tick Period Generator 308. In receive mode, the register may be referred to as the SYNCTIME register.

In order to receive a SENT message, the Sync Period Detector 302 must first measure the time of the sync period 102, which as mentioned above is always 56 unit times (ticks) in duration. Specifically, the Sync Period Detector 302 must determine the number of CPU clock cycles in one 56 tick period. Once the sync period time is known, this data can be used by the Tick Period Generator 308 to determine the length of each incoming data nibble. The nibble data value is encoded in the amount of time between falling edges and can vary between 12 and 27 tick times.

One method of making this sync period measurement is to divide the CPU clock by 56 and then count the number of divided clocks that occur during an incoming sync period. This resulting value then represents the number of CPU clocks in 1 tick time and can be used as a count period for Tick Period Generator 308 which measures the length of the incoming data nibbles. However, the issue with this solution is that the CPU clock frequency must be relatively high in order to receive SENT messages at the fastest allowed data rates.

Accordingly, in some embodiments, instead of dividing the CPU clock by 56, the clock divider 304 of the Sync Period Detector 302 divides the CPU clock by 7 or 14 instead. Note that these divide values are evenly divisible into 56. So, the Sync Timer 306 of the Sync Period Detector 302 will count the number of CPU clocks in 8 or 4 tick times, respectively.

In order to increase the accuracy of the nibble length measurement, embodiments 'dither' the period value used by the Tick Period Generator 308. As an example, suppose that the CPU clock is divided by 14 to measure the length of the sync period and a count value of 00011101b was captured in the Sync Period Detector 302. Since this count value of 29 decimal represents the number of CPU clocks in 4 tick times, the number of CPU clocks per tick time would be 29/4=7.25. Based on the value of the two least significant bits, the Tick Period Generator 308 would use a count period of X=7 for three count periods and a period value of X=8 for one count period. This produces an average count period of 7.25 over four count periods. Hence, a received pulse length can be accurately measured and the respective nibble value determined.

In some embodiments, the Sync Period Detector 302 has two functions. First, it validates that a period of time within a SENT message is Sync period and not a nibble period. Second, the Sync Period Detector 302 captures the actual Sync period time value for use by the Tick Period Generator 308. The Sync Period Detector may operate at all times during message reception. This may allow the receiver to re-synchronize at any time within a SENT message frame.

The Sync Period Detector 302 has a dedicated timer 306 that is reset on every falling edge of the SENT message. The SYNCMIN[15:0] 320 and SYNCMAX[15:0] 318 control registers allow user software to configure a time window for the expected Sync period. These registers are configured with the minimum and maximum times expected for a valid Sync period.

If a falling edge is received and the Sync period timer contains a value between SYNCMIN and SYNCMAX, then the time period is treated as a valid Sync period. The Sync period timer value is captured in the SENTSYNC register 324. The value in the SENTSYNC register 324 is used by the Tick Period Generator 308. In addition, this value allows user software to compare the present Sync period time with those of prior messages. The SENT protocol allows no more than 1.5625% (1 in 64) timing variation between successive messages.

When a valid sync period has been received, the receiver will expect 3-8 nibble periods to follow containing 12-27 tick periods each.

The Tick Period Generator 308 uses the time value captured and stored in the SENTSYNC register 324 to determine the time period for TTICK. The Tick Period Generator 302 is active when a valid time between SYNCMIN and SYNC-MAX has been detected.

The Nibble Period Counter 310 uses a clock generated by the Tick Period Generator 308 and determines the amount of time actually elapsed during a nibble period. The minimum nibble period is 12 ticks for a data value of '0' and the maximum nibble period is 27 ticks for a data value of '15'. The Nibble Period Counter 310 removes this offset of 12 ticks and provides the actual nibble data value in the SENTDATA register 326.

If any nibble period is detected outside of the allowable range of 12 to 27 ticks, the reception is aborted and a value of '0' is stored for that nibble in the SENTDATA register. At this time, synchronization is considered to be lost and the module waits for another valid Sync period before reception may resume.

In some embodiments, reception of a nibble data value occurs for the following conditions: a valid Sync period within the valid time window has been detected; fewer than 8 nibbles have been received since the last Sync period; and a falling edge has been detected. The time since the last falling edge is at least 12 tick times, but no more than 27 tick times.

Data are packed in the SENTDATA register 326 after reception. The data value in each nibble location will be present until overwritten during the next data frame.

Accordingly, in some embodiments, the receiver configuration requires knowledge of the nominal tick period sent by the transmitter, TTICK and the Input clock frequency to the SENT Protocol Receiver, Fclk.

The input clock period to the receiver should be at least ⅛th the tick period, TTICK, or smaller. This will provide a captured value in the SENTSYNC register that is at least 64. The SENT protocol requires software verify that the length of the sync period does not change more than 1 in 64 between messages.

In practical application, a 4 MHz clock input will be satisfactory for all tick periods down to 3 us. The receiver clock frequency, Fclk, is either Fcy or Fcy/4 depending on the setting of a SENTCON1.PS control bit.

Once TTICK and Fclk are known, the nominal SYNCMIN and SYNCMAX values are calculated as shown below:

$Frcv=Fcy$ (for $PS=0$)

$Frcv=Fcy/4$ (for $PS=1$)

$SyncCount = 8 \cdot FRcv \cdot TncK$ $SYNCMIN = 0.8 \cdot SyncCount$ $SYNCMAX = 1.2 \cdot SyncCount$ For example, for TTick=3 us and Fclk=4 MHz, SYCMIN=76 and SYNCMAX=115. The nominal sync period is 96.

Under normal operation, the module will produce an interrupt event when a valid sync period has occurred followed by 3-8 valid nibble time periods. At this time, user software may read the status nibble, CRC nibble, and the 1-6 data nibbles from the SENTDATA register.

User software should read the contents of the SENTDATA register before the end of the next sync period and first data nibble to avoid data overwrites.

The J2716 specification requires that the Sync period of the SENT data frame varies by no more than 1.5625% (1 in 64) between consecutive data frames. To verify this condition is met, user software should save the value captured in SENTSYNC after each data frame is received. The old value can then be compared to the value received during the next data frame.

The Sync Period Detector 302 is a dedicated timebase with a time window comparison function and a time capture function. The Sync Period Detector logic operates on every falling edge of received data input. This allows the Sync Period Detector to resynchronize to a data frame at any time.

In some embodiments, the Sync Period Detector 302 has a 16-bit timebase The sync period timebase is compared to the two values, SYNCMIN and SYNCMAX. In some embodiments, the Sync Period Detector 302 will produce a synchronization event signal for the rest of the module to use on the following events: a falling edge has been detected on the SENT data input AND a true comparison of the timebase with SYNCMIN has occurred since the last falling edge, AND a true timebase comparison with SYNCMAX has NOT occurred since the last falling edge.

When all of the above events occur, the sync period timebase value is captured in the SENTSYNC register 324 and a SENTSTAT.SYNC bit is set At this time, the receiver will begin looking for data nibble time periods that are 12-27 ticks in length.

At each falling edge of SENT data in, the following events will occur: the window comparison described above is performed; the sync period timebase is reset; and the time base and time window comparison logic for the SYNCMIN and SYNCMAX registers are reset to prepare for the next window comparison.

If the sync period timebase count value reaches the value of SYNCMAX before another falling edge, the timebase is reset to '0'. The timebase remains at '0' until another falling edge is detected.

Figure 4:
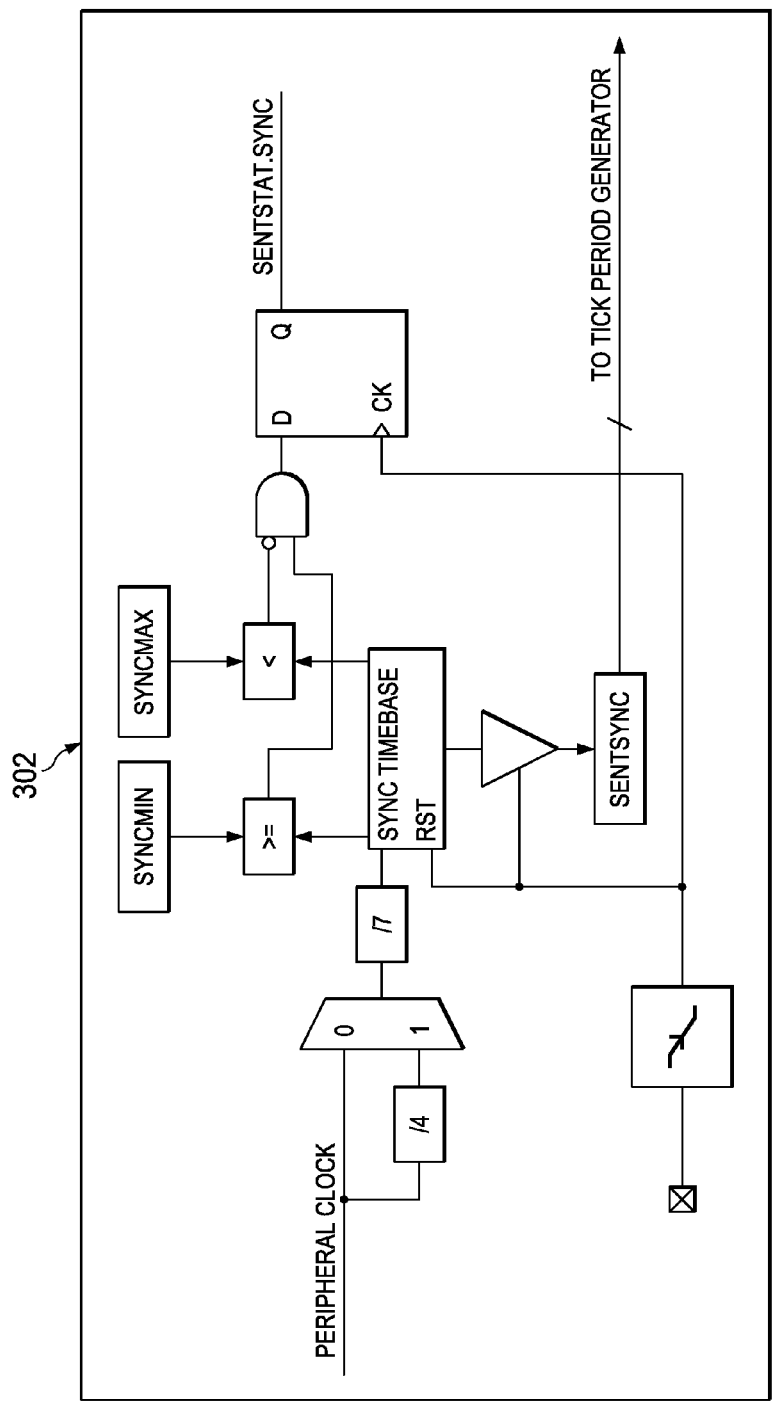
FIG. 4 is a diagram illustrating an exemplary sync period detector in accordance with embodiments.

A conceptual exemplary block diagram of the Sync Period Detector 302 is shown in FIG. 4. The timing for the detection of a valid synchronization period is shown in FIG. 5. It is assumed that the valid sync period was preceded by a nibble period which is much shorter than a sync period. Therefore, the sync period timebase has been counting since the last detected falling edge.

Figure 5A:
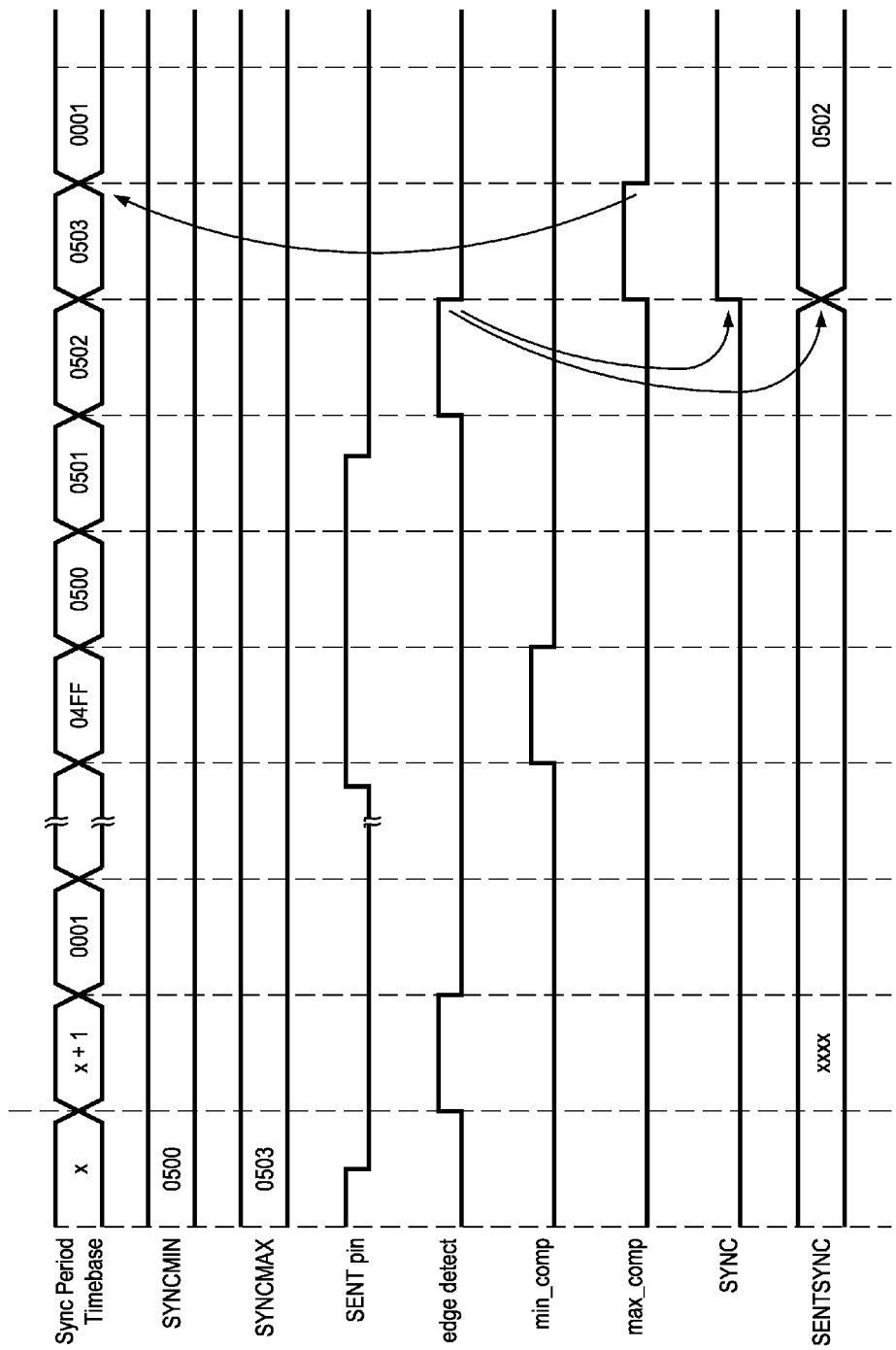
FIG. 5A-FIG. 5C are timing diagrams illustrating sync period detector operation in accordance with embodiments.

In FIG. 5A, the timebase is reset to 0 when the first falling edge is detected. The second falling edge falls within the window of SYNCMIN and SYNCMAX, so SYNC is set and the timebase value is captured in SENTSYNC.

Figure 5B:
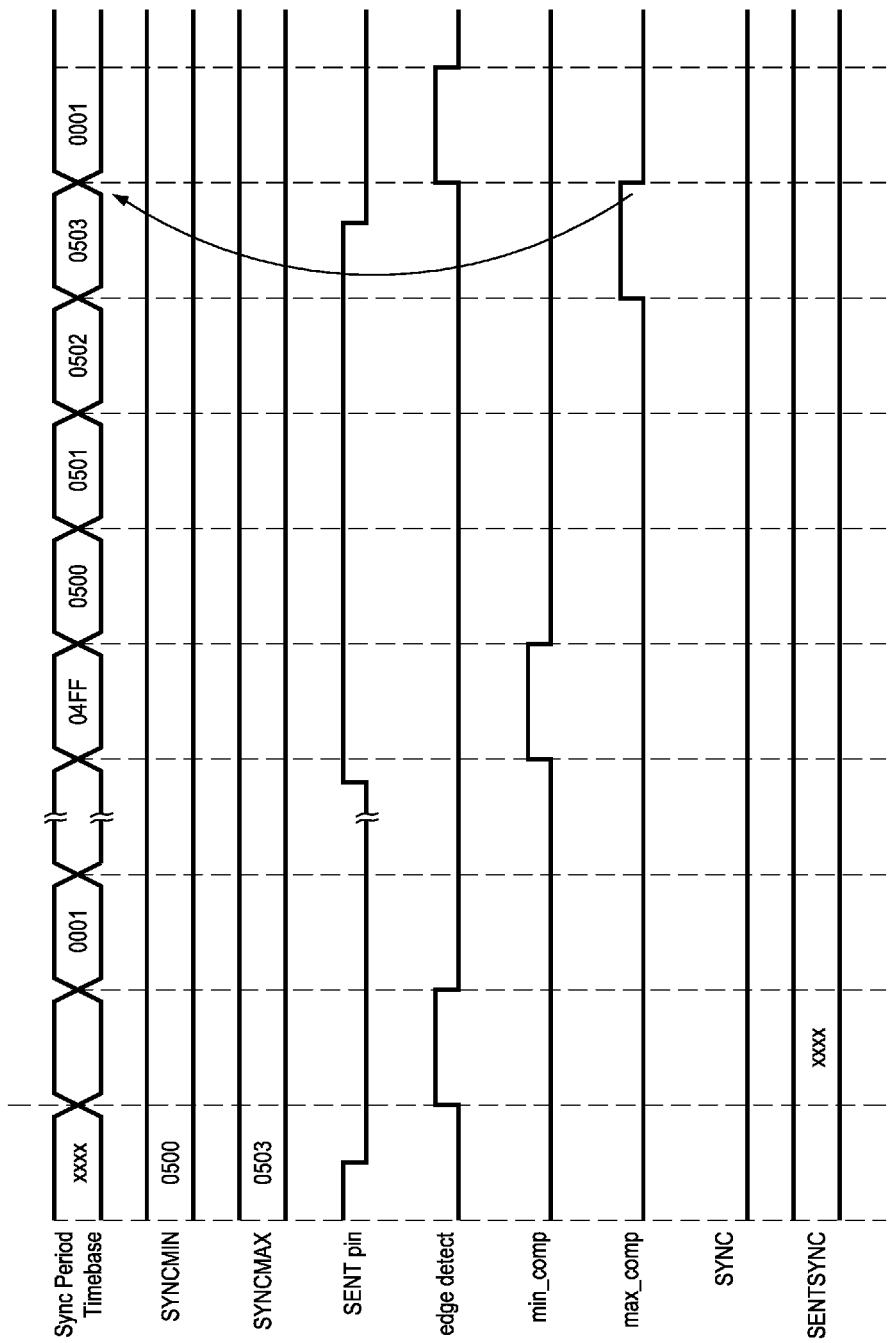

FIG. 5B shows the timing for successive periods that are longer than the time of a valid sync period. The sync period timebase is held in Reset once a match with SYNCMAX occurs. No capture value is stored in the SENTSYNC register.

Figure 5C:
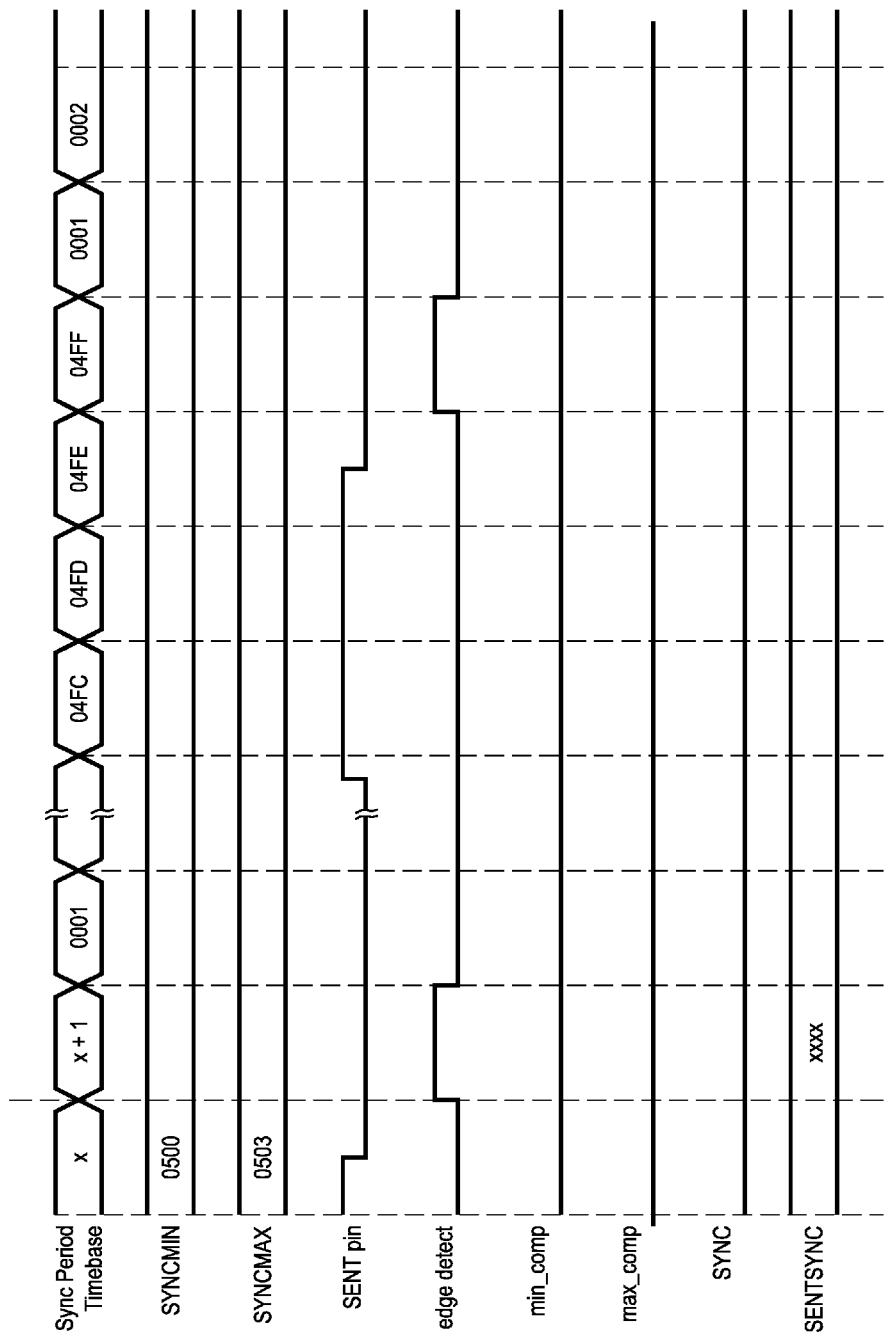

FIG. 5C shows the timing for successive periods that are shorter than SYNCMIN. The sync period time-base is reset on each detected falling edge and no capture value is stored in the SENTSYNC register.

The Tick Period Generator 308 is responsible for setting the sample rate during a nibble data period. For the Tick Period Generator 302 to operate, a valid sync period must have been detected (SYNC=1) and the macro must be in a state in which nibble data is expected.

In some embodiments, the Tick Period Generator contains a 13-bit timebase. The count period for this timebase is set by the SENTSYNC[15:3] value.

According to one embodiment, the peripheral clock input (or the prescaled peripheral clock if SENTCON1.PS=1)(FIG. 4) is divided by 7 and used as the sync timebase clock. As noted above, the period of a valid sync pulse is 56 tick times (It is noted that in other embodiments, the clock may be divided by a number other than 7).

Therefore, the value of SENTSYNC[15:3] represents the number of upbm_fsm_clk cycles in one tick period of the SENT protocol. This value can be used as a divider value for the Tick Period Generator timebase. The value of SENTSYNC[15:4] represents the number of upbm_fsm_clk cycles in ½ of a tick period.

The Tick Period Generator 308 operates as follows:

1. If a falling edge is detected on the SENT data input, a valid sync period has been detected, and the macro is in a nibble data reception state, the Tick Period Generator is initially loaded with a value of SENTSYNC[15:4] (½ of a tick period). This centers the Tick Period Generator 302 to the center of a tick time period.

2. When the Tick Period Generator timebase (not shown) expires, a clock pulse is generated for use by the Nibble Period Counter 310.

3. The timebase is then loaded with the value of SENTSYNC[15:3] or SENTSYNC[15:3]+1, representing a full tick period, depending on dithering, as will be discussed in greater detail below.

4. Each time the Tick Period Generator timebase expires, the timebase is reloaded with SENTSYNC[15:3] and a clock pulse is generated for the Nibble Period Counter 310.

5. Step 3 and 4 repeat until the next falling edge is detected.

To ensure the Tick Period Generator 308 is accurate with the lowest frequency clock sources, the count period of the Tick Period Generator timebase is dithered over a period of 4 count cycles.

As noted above, the SENTSYNC register 324 is loaded with the captured sync period from the sync timer 306. As noted above, this is the number of clock cycles in a number of sync periods. For example, in some embodiments, where the number of unit times in a sync period is 56 and is divided by 7, this number is 8.

Consequently, the dithering of the timebase period may be performed based on the value of the SENTSYNC[2:1] register as follows:

If SENTSYNC[2:1]=2'00, no dithering is performed on the timebase period value.

If SENTSYNC[2:1]=2'01, the timebase period is loaded with SENTSYNC[15:3]+1 every fourth period.

If SENTSYNC[2:1]=2'10, the timebase period is loaded with SENTSYNC[15:3]+1 every other period.

If SENTSYNC[2:1]=2'11, the timebase period is loaded with SENTSYNC[15:3]+1 three out of four periods.

Figure 6:
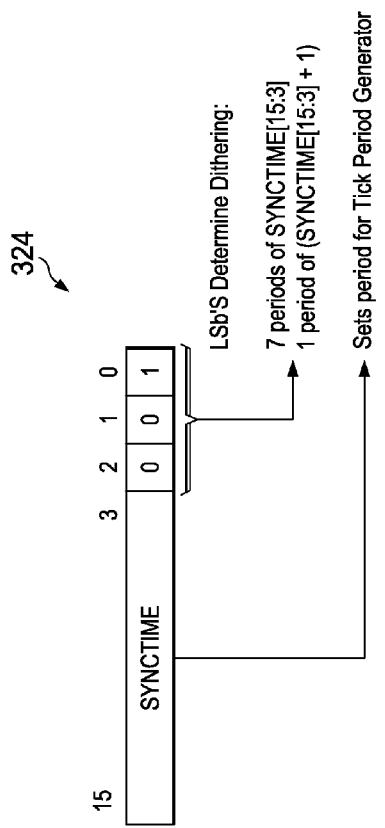
FIG. 6 is a timing diagram illustrating dithering operation in accordance with embodiments.

This is shown in FIG. 6, which represents the SENTSYNC register 324. Using the SENTSYNC[15:3] bits divides by 8 to obtain the number of cycles in a single sync period, SYNCTIME. The remaining, least significant bits provide the remainder and are thus used to determine the dithering, which results in a proportional, averaged over time, lengthening of the timebase period.

Figure 7:
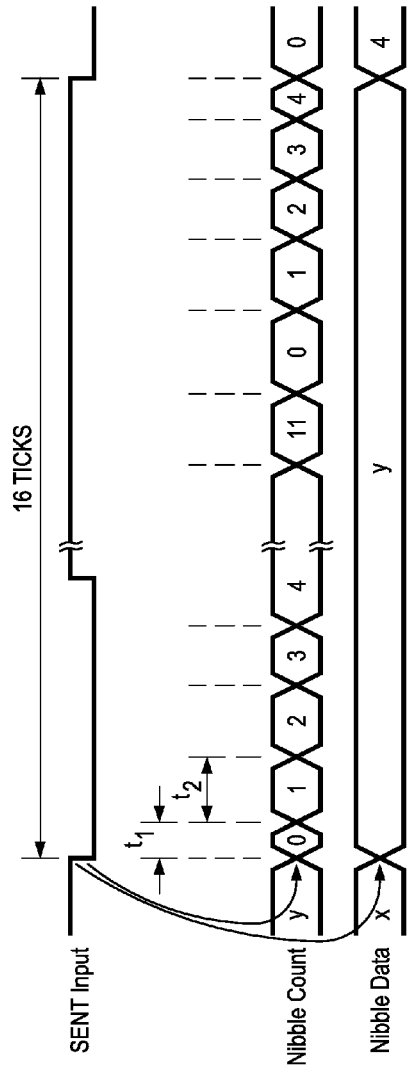
FIG. 7 illustrates a SENTSYNC control register in accordance with embodiments.

FIG. 7 shows the timing for the Tick Period Generator 324. In the figure, t1 is the count period determined by SENTSYNC[15:4] and t2 is the count period determined by SENTSYNC[15:3].

The Nibble Period Counter 310 works along with the Tick Period Generator to determine the data value of each nibble. The Nibble Period Counter 310 has a 4-bit counter. If the macro is in a state in which nibble data is expected to be received, the Nibble Period Counter 310 will count pulses from the Tick Period Generator 324.

FIG. 7 also shows the timing for the Nibble Period Counter 310. After a falling edge of the SENT data input, the Nibble Period Counter 310 is first configured to count 12 clocks from the Tick Period Generator 324. No further falling edges should occur on the SENT data input during this time. After 12 clocks have been counted, the counter is reset and will count clocks from the Tick Period Generator 324 until another falling edge is detected on the SENT data input When the next falling edge is detected on the SENT data input, the count value is captured for storage in the appropriate data register. Secondly, the counter is reset to prepare for the next nibble data period.

If fewer than 12 clocks have been counted by the Nibble Period Counter 310 between successive falling edges, the nibble data should be set to '0' and a framing error should be generated.

If more than 27 total clocks are counted by the Nibble Period Counter 310 during a period in which nibble data is expected, the nibble data should be set to '0' and a framing error should be generated. The Nibble Period Counter 310 may be held in Reset until another valid sync period is found and the module is in a state to receive nibble data again.

Each data nibble is stored in the appropriate 4-bit SENTDATA register location as it is received. Old nibble data must be read before a new nibble value is received.

The SENTCON1.NIBCNT[2:0] control bits set the number of expected data nibbles to be received in a data frame.

The DATA2-DATA6 fields in the SENTDATA register may be skipped and not written by the module depending on the NIBCNT[2:0] setting.

Figure 8:
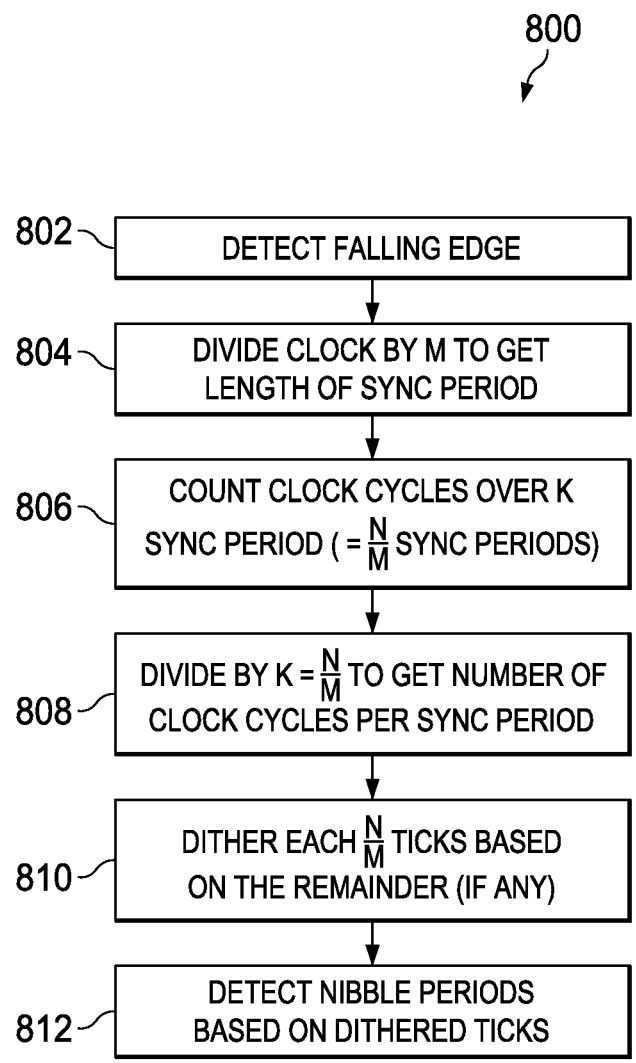
FIG. 8 is a flowchart illustrating operation of embodiments.

Turning now to FIG. 8, a flowchart 800 illustrating operation of embodiments is shown. Upon detection of a falling edge and, depending on the embodiment, one or more other status indicia (step 802), the SENT receive peripheral's clock divider 304 will divide the sync period length (N unit times or ticks) by a number M, preferably where M divides N evenly, to obtain a number of sync periods K. For example, the SENT sync period is N=56 unit times; in some embodiments, M is 28, 14, or 7.

The sync timer 306 counts the number of clock cycles in K (=N/M) sync periods (step 806). The number of clock cycles C per sync period is then obtained (step 808). For example, the number of clock cycles counted may be divided by the number K. Based on the remainder (if any), this number is dithered proportionally so that a predetermined number of the next K unit times are C cycles in length and a predetermined number are C+(remainder) unit times in length.

In particular, some embodiments, the number of cycles K*C is loaded to the Tick Period Generator 308 and the SENTSYNC control register 324, as discussed above. The number C is obtained by examining the appropriate most significant bits of the SENTSYNC register. The least significant bits of the Sync Period Detector 306 are examined and the dithering is based on the result. The Nibble Period Detector 310 then detects nibbles based upon the Tick Periods lengths received from the Tick Period Generator, as discussed above (step 812).

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary.

While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

What is claimed is:

1. A method for determining a unit time of a serial transmission protocol, wherein the serial transmission protocol defines a unit time (UT) by transmitting a calibration pulse having a predetermined length of N*UT, wherein the transmission protocol sends the calibration pulse followed by a plurality of data nibbles, wherein each data nibble is encoded by an associated pulse width length which is a multiple of the UT, and wherein a receiver is operated by a system clock, the method comprising:

dividing the system clock by M, wherein M evenly divides N, measuring the calibration pulse length using the divided system clock sampling a received data nibble length by using a sampling clock, wherein the sampling clock is a clock signal derived by dithering the divided system clock.

2. The method according to claim 1, wherein the N=56 and M=7.

3. The method according to claim 1, wherein the N=56 and M=14.

4. The method according to claim 3, wherein using the sampling clock comprises dividing a determined length of the calibration pulse by N/M and dithering the system clock based on the division result and its remainder.

5. The method according to claim 4, wherein a period timer is used to perform dithering of the system clock, wherein the period timer is loaded for a first number of time periods with a first value and for a second number of time period with a second value, different from the value, to generate a dithered count period.

6. The method according to claim 5, wherein the sum of the first number times the first value and the second number times divided by the first and second number is approximately equal to the number of clock cycles of the calibration pulse divided by N/M.

7. The method according to claim 1, wherein the N=56 and M=28.

8. The method according to claim 1, wherein a pulse is defined by the time between two subsequent falling or rising edges.

9. A system for determining a unit time of a serial transmission protocol, wherein the serial transmission protocol defines a unit time (UT) by transmitting a calibration pulse having a predetermined length of N*UT, wherein the transmission protocol sends the calibration pulse followed by a plurality of data nibbles, wherein each data nibble is encoded by an associated pulse width length which is a multiple of the UT, and wherein a receiver is operated by system clock, comprising:

a clock divider configured to divide the system clock by M, wherein M evenly divides N, a pulse width measurement unit confirmed to measure the calibration pulse using the divided system clock, a detector for sampling a received data nibble length by using a sampling clock wherein the sampling clock is derived by dithering the system clock.

10. The system according to claim 9, wherein the N=56 and M=7.

11. The system according to claim 9, wherein the N=56 and M=14.

12. The system according to claim 11, wherein for generating the sampling clock the system is operable to divide a determined length of the calibration pulse by N/M and the system comprises a dithering unit configured to dither the system clock based on the division result and its remainder.

13. The system according to claim 12, wherein the dithering unit comprises a period timer, wherein the period timer is controlled to be loaded for a first number of time periods with a first value and for a second number of time period with a second value to generate a dithered sampling clock signal.

14. The system according to claim 13, wherein the sum of the first number times the first value and the second number times divided by the first and second number is approximately equal to the number of clock cycles of the calibration pulse divided by N/M.

15. The system according to claim 9, wherein the N=56 and M=28.

16. The system according to claim 9, wherein a pulse is defined by the time between two subsequent falling or rising edges.

17. A method for receiving a serial transmission, comprising:

detecting a falling edge of a calibration pulse;

dividing a clock by M, where M evenly divides N, where N*UT is a length of the calibration pulse and UT is a unit time;

detecting a subsequent falling edge of the calibration pulse and counting clock cycles of the divided clock over the length of the calibration pulse;

dividing the number of counted clock cycles by N/M to obtain a fractional number of clock cycles per UT;

dithering the clock according to the fractional number; and detecting received data nibble periods based on the dithered clock.

18. The method according to claim 17, wherein the N=56 and M=7.

19. The method according to claim 17, wherein the N=56 and M=14.

20. The method according to claim 19, wherein a period timer is used to perform dithering of the clock, wherein the period timer is loaded for a first number of time periods with a first value and for a second number of time period with a second value different from the first value to generate a dithered clock which is operable to match said fractional number of clock cycles.

21. The method according to claim 17, wherein the N=56 and M=28.

22. A method for determining a unit time of a serial transmission protocol, wherein the serial transmission protocol defines a unit time (UT) by transmitting a calibration pulse having a predetermined length of N*UT, wherein the transmission protocol sends the calibration pulse followed by a plurality of data nibbles, wherein each data nibble is encoded by an associated pulse width length which is a multiple of the UT, and wherein a receiver is operated by a system clock, the method comprising:

dividing the system clock by M;

measuring the calibration pulse length using the divided system clock;

and sampling a received data nibble length by using a sampling clock, wherein the sampling clock is a clock signal derived by dithering the system clock based on a result of dividing the measured calibration pulse length by N/M.

* * * * *